(12) United States Patent
Molina

(10) Patent No.: US 7,630,457 B2
(45) Date of Patent: Dec. 8, 2009

(54) METHOD AND APPARATUS FOR DEMODULATING A RECEIVED SIGNAL WITHIN A CODED SYSTEM

(75) Inventor: Robert J. Molina, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1116 days.

(21) Appl. No.: 10/739,505

(22) Filed: Dec. 18, 2003

(65) Prior Publication Data

US 2005/0135511 A1    Jun. 23, 2005

(51) Int. Cl.
*H03K 9/00* (2006.01)
*H04L 27/00* (2006.01)

(52) U.S. Cl. ...................... 375/316; 375/324
(58) Field of Classification Search .......... 375/142, 375/324, 343, 150, 316, 326, 344, 145; 342/378; 708/422, 425; 704/226; 329/313, 345
See application file for complete search history.

(56) References Cited

U.S. PATENT DOCUMENTS

| | | | | |
|---|---|---|---|---|
| 5,768,307 | A * | 6/1998 | Schramm et al. | 375/150 |
| 5,933,464 | A * | 8/1999 | Zogg | 375/343 |
| 6,438,183 | B1 * | 8/2002 | Taura et al. | 375/343 |
| 6,456,646 | B1 * | 9/2002 | Asokan et al. | 375/142 |
| 6,683,493 | B1 * | 1/2004 | Fujimora et al. | 329/304 |
| 6,891,906 | B1 * | 5/2005 | Sogabe et al. | 375/343 |
| 7,010,559 | B2 * | 3/2006 | Rawlins et al. | 708/425 |
| 7,065,158 | B2 * | 6/2006 | Awater et al. | 375/322 |
| 7,254,190 | B2 * | 8/2007 | Kwentus et al. | 375/340 |
| 7,324,433 | B1 * | 1/2008 | Hsu et al. | 370/208 |
| 7,353,170 | B2 * | 4/2008 | Feldman et al. | 704/226 |
| 2003/0012312 | A1 * | 1/2003 | Gerhards et al. | 375/343 |
| 2003/0112897 | A1 * | 6/2003 | Murthy et al. | 375/324 |
| 2003/0214434 | A1 * | 11/2003 | Gronemeyer | 342/378 |
| 2004/0230628 | A1 * | 11/2004 | Rawlins et al. | 708/422 |
| 2006/0008036 | A1 * | 1/2006 | Moriai | 375/343 |

OTHER PUBLICATIONS

Grant, Alex J. et al.; "Efficient Maximum Likelihood Decoding of Peak Power Limiting Codes for OFDM"; VTC '98; 1998; pp. 2081-2084; IEEE.

* cited by examiner

*Primary Examiner*—Tesfaldet Bocure
*Assistant Examiner*—Lawrence B Williams
(74) *Attorney, Agent, or Firm*—Joanna G. Chiu

(57) ABSTRACT

A receiver includes an input, a correlator, a phase-assisted demodulator, and an output. The input receives a modulated signal and the correlator generates a plurality of correlation values from the received modulated signal The phase-assisted demodulator, coupled to the correlator, selects one of the plurality of correlation values based on relative magnitude and relative phase information of at least a two of the plurality of correlation values. The output provides a demodulated signal, corresponding to the modulated signal, based on the selected one of the plurality of correlation values. The correlation value having the largest magnitude and the correlation value having the second largest magnitude is used in combination with the relative phase information of both correlation values in determining which correlation value corresponds to the correct demodulated symbol.

20 Claims, 3 Drawing Sheets

| NUMBER OF CORRELATIONS | CORRELATION VALUES | MAGNITUDE |
|---|---|---|
| 1 | {8,-8,8j,-8j} | 8 |
| 6 | {4+4j,4-4j,-4+4j,-4-4j} | $8/\sqrt{2}$ |
| 12 | {4,-4,4j,-4j} | 4 |
| 8 | {2+2j,2-2j,-2+2j,-2-2j} | $4/\sqrt{2}$ |
| 37 | 0 | 0 |

| CORRELATION VALUES | MAGNITUDE | PHASE |
|---|---|---|
| 7 + 2j | 7.28 | 15.95 |
| 6.9 + j | 5.97 | 8.25 |

*FIG. 4*

METHOD AND APPARATUS FOR DEMODULATING A RECEIVED SIGNAL WITHIN A CODED SYSTEM

FIELD OF THE INVENTION

The present invention relates to a receiver, more particularly, to demodulation techniques within a receiver.

RELATED ART

In 802.11b, as in many wireless systems, harsh channel environments and long distances between transmitter and receiver lead to performance degradation, reduced signal-to-noise ratios, and errors in the received signal. The transmitted signal may be annihilated by the effects of noise in the channel and require demodulation techniques that ensure that the proper symbol is decoded by the receiver.

Some conventional demodulation techniques, such as complementary code keying (CCK), use a Fast Hadamard Transform (FHT) correlator to generate correlation values from an incoming symbol and use the correlation value corresponding to the largest magnitude to determine the correct symbol that has been transmitted. However, in many situations it is possible that the correlation value with the largest magnitude does not correspond to the correct symbol that needs to be demodulated. In other words, the magnitude of the correlation value having the largest magnitude may have been attributed to, for example, noise, interference, etc., within the transmission channel and thus not correspond to the correct symbol. Demodulating the incorrect symbol is detrimental to the wireless system since it results in the processing and output of erroneous data by the receiver. In such a case, the symbol is incorrectly decoded.

Hence the need exists for an improved receiver which allows for reduced errors caused by channel degradation.

BRIEF DESCRIPTION OF THE DRAWINGS

The present invention is illustrated by way of example and not limited by the accompanying figures, in which like references indicate similar elements, and in which:

FIG. 4 illustrates, in table form, correlation values, magnitude, and phase values consistent with another embodiment of FIG. 1.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

One embodiment of the present invention relates to a method for demodulating a received signal. A modulated signal is received. A plurality of correlation values are generated from the received modulated signal. One of the plurality of correlation values is selected based on relative magnitude and relative phase information of at least two of the plurality of correlation values. The selected one of the correlation values is used to provide a demodulated symbol corresponding to the received modulated signal.

Another embodiment of the present invention relates to a method for demodulating a received signal. A modulated symbol is received. A plurality of correlation values are generated from the received modulated signal. At least two of the plurality of correlation values are selected based on magnitude information of the plurality of correlation values. One of the at least two of the plurality of correlation values is selected based on at least one of magnitude information or phase information of the at least two plurality of correlation values. The selected one of the at least two of the plurality of correlation values and a corresponding index of the selected one of the at least two of the plurality of correlation values is used to provide a demodulated symbol corresponding to the received modulated symbol.

Another embodiment of the present invention relates to a receiver. The receiver includes an input which receives a modulated signal, a correlator which generates a plurality of correlation values from the received modulated signal, a phase-assisted demodulator coupled to the correlator which selects one of the plurality of correlation values based on relative magnitude and relative phase information of at least a two of the plurality of correlation values, and an output which provides a demodulated signal, corresponding to the modulated signal, based on the selected one of the plurality of correlation values.

Complementary Code Keying (CCK) is a modulation scheme used in 802.11b for higher data rates, such as 5.5 Mbps and 11 Mbps. Complementary codes are a subset of Reed-Muller codes and provide reasonably good performance at higher data rates in multipath environments.

Figure 1:
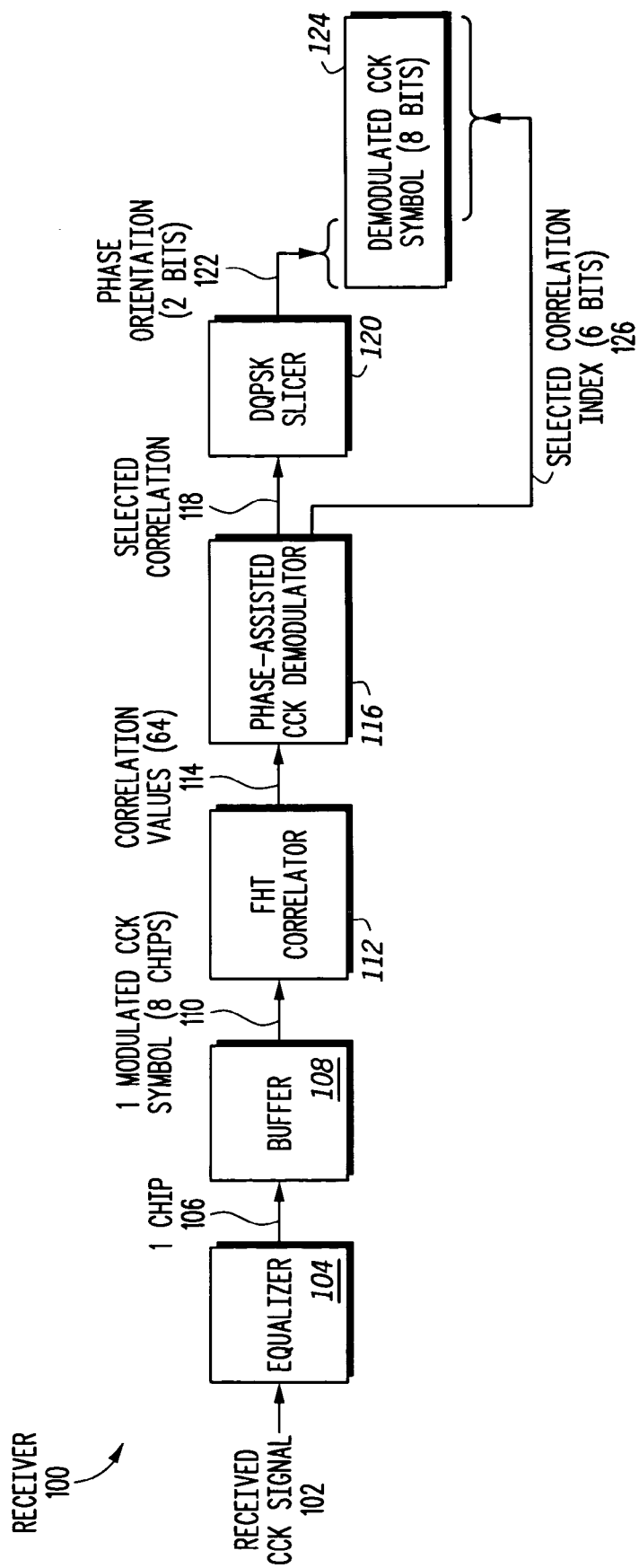
FIG. 1 illustrates, in block diagram form, a receiver in accordance with one embodiment of the present invention.

In one embodiment of the present invention illustrated in FIG. 1, a transmitted CCK signal 102 is received by receiver 100 and provided to equalizer 104. In one embodiment of the present invention received signal 102 may be a modulated signal that adheres to an IEEE 802.11 standard. Equalizer 104 receives CCK signal 102 and mitigates the effects of multipath interference caused by the communications channel between the transmitter of CCK signal 102 and receiver 100. Equalizer 104 may be any equalizer as known in the art which performs mitigation operations similar to those described above. Equalizer 104 then outputs chip 106 (which is a data point that includes both magnitude and phase) to buffer 108.

Buffer 108 then gathers a plurality of chips to form modulated CCK symbol 110. The CCK symbol 110 has been modulated to allow the symbol to be transmitted across the communications channel. In one embodiment of the present invention, buffer 108 may gather 8 chips. However, in alternate embodiments, the number of chips gathered by buffer 108 may vary. Correlator 112 receives incoming CCK symbol 110 and compares the received CCK symbol 110 to the set of possible-sent symbols pre-generated by correlator 112. Correlator 112 provides the correlation values 114 corresponding to the possible-sent symbols to phase-assisted demodulator 116. Phase-assisted demodulator 116 provides as its output selected correlation 118 and selected correlation index 126. The selected correlation 118 is fed into slicer 120 which performs slicing operations and provides phase orientation 122 (two bits) as the first portion of the demodulated CCK symbol 124. The selected correlation index 126 (six bits) is provided as the second portion of demodulated CCK symbol 124 whose combination with phase orientation 122 (two bits) results in the desired demodulated CCK symbol 124. In one embodiment of the present invention, correlator 112 may be an FHT correlator, phase-assisted demodulator 116 may be a phase-assisted CCK demodulator, and correspondingly, slicer 120 may be a differential quadrature phase shift keying (DQPSK) slicer.

In operation of at least one embodiment of the present invention, receiver 100 receives signal 102, equalizes it, and provides enough chips 106 to buffer 108 to form a modulated symbol 110. Correlator 112 of receiver 100 receives modulated symbol 110 and generates correlation values 114 corresponding to each of the possible-sent-symbols. In one embodiment of the present invention, correlator 112 generates correlation values 114 by doing the equivalent of multiplying the incoming symbol 110 by the complex conjugate of each of the possible-sent-symbols to generate the correlation values 114.

In one embodiment of the present invention, correlator 112 generates the possible-sent-symbols by separating an 8 bit CCK symbol into N components $\phi_1$ to $\phi_N$. For example, in one embodiment, the 8 bit CCK symbol is separated into 4 components such that $u=[\phi_1,\phi_2,\phi_3,\phi_4]$. Each $\phi$ component represents a two bit set beginning with the first two bits of the 8 bit symbol. A constellation diagram, or mathematical equivalent, may be used to convert each two bit set into its complex number equivalent. That is, the two bit set 00 may be represented as 1, the two bit set 01 may be represented as j, the two bit set 10 may be represented as −1, and the two bit set 11 may be represented as −j. For example, for an 8-bit CCK symbol 01011010, u=[j,j,−1,−1].

To determine the possible-sent-symbols for an 8-bit CCK symbol the following formula, which is well known in the art, may be used:

$$v = \left(\frac{\pi}{2}\right)^{G^T u}$$

where v represents the possible-sent-symbol and G represents a generator matrix $$G = \begin{pmatrix} 1 & 1 & 1 & 1 & 1 & 1 & 1 & 1 \\ 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{pmatrix}.$$

In addition, the number of possible-sent-symbols (p) can be determined using $p=4^x$, where x is the number of $\phi$ components in u. For example, for x=4 there are 256 possible-sent-symbols. However, because of mathematical properties related to generating the correlation values, $\phi_1$ may be disregarded, u may be simplified to $\tilde{u}=[\phi_2,\phi_3,\phi_4]$ and the generator matrix G may be simplified to $$G' = \begin{pmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{pmatrix}.$$

Thus our initial equation v reduces to $$v' = \left(\frac{\pi}{2}\right)^{(G')^T \tilde{u}}.$$

The number of possible-sent-symbols then reduces to 64, since there are only 3$\phi$ components in $\tilde{u}$. In this case, for x equal to 3, there are 64 possible-sent-values and 64 corresponding correlation values.

The correlation values 114, as described earlier, can then be calculated using received CCK symbol 110 and the possible-sent-symbols, such that

[received_CCK_symbol]·[(possible_sent_symbol$_1$)*]= [correlation_value$_1$] . . .

[received_CCK_symbol]·[(possible_sent_symbol$_{64}$)*]= [correlation_value$_{64}$]

The correlation values 114 are provided to phase-assisted demodulator 116 for use in determining which symbol of the possible-sent-symbols is most correlated with the modulated symbol 110. In other words, phase-assisted demodulator 116 evaluates the correlation values and the magnitudes and phases of the correlation values and determines which symbol was actually sent by the transmitter.

Phase-assisted demodulator 116 receives correlation values 114 (having both magnitude and phase) and selects the largest correlation value (the correlation value having the largest magnitude), C1, and the second largest correlation value (the correlation value having the second largest magnitude), C2. Phase-assisted demodulator 116 then determines if the second largest magnitude of C2 is within a predetermined range of C1. For example, in one embodiment, the predetermined range is 5% where the phase-assisted demodulator 116 determines whether the second largest magnitude falls within 5% of the largest magnitude. When the magnitude of C2 is not within the specified predetermined range of C1, phase-assisted demodulator 116 provides C1 as the selected correlation 118 and provides the index of C1 as the selected correlation index 126. When the magnitude of C2 is within the specified predetermined range of C1, phase-assisted demodulator 116 compares the phase of C1 to the phase of C2 and determines which of the phases is closest to an integer multiple, n, of $$\frac{\pi}{2} \left(\text{i.e.}, n\frac{\pi}{2} \text{ where } n = \ldots -1, 0, 1, 2, \ldots\right).$$

This expression can also be expressed as an n multiple of 90 degrees (i.e., n90 degrees where n= . . . −1,0,1,2, . . . ). One example of the method used to determine which one of C1 and C2 has a phase closest to $$n\frac{\pi}{2}$$

will be described below in reference to FIG. 2. The correlation value having its phase closest to $$n\frac{\pi}{2}$$

is selected as being the correlation value whose corresponding symbol is provided as the demodulated symbol 124.

The selected correlation 118 corresponding to the selected correlation value is then provided to slicer 120. Slicer 120 then evaluates the selected correlation 118 (using a constellation diagram or mathematical equivalent) to provide phase orientation 122 (two bits). The selected correlation index 126 (six bits) and the phase orientation 122 (two bits) corresponding to the selected correlation value are concatenated to yield the desired demodulated symbol 124.

Figures 2, 3:
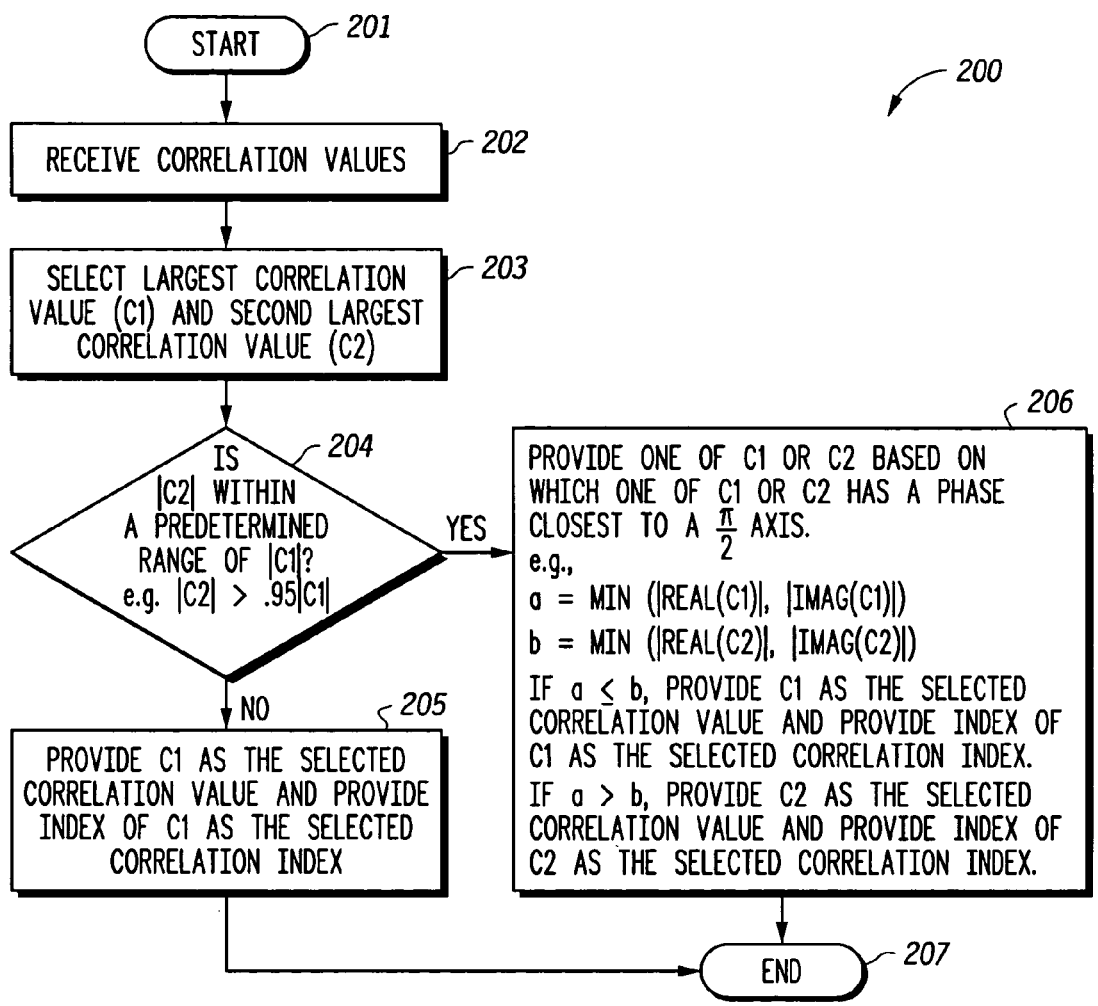
FIG. 2 illustrates, in flow diagram form, operation of the receiver in FIG. 1 in accordance with one embodiment of the present invention.
FIG. 3 illustrates, in table form, number of correlations, magnitude, and correlation values consistent with one embodiment of FIG. 1.

In one example provided in reference to FIG. 2, assume that receiver 100 is noise-free, interference-free and utilizes a CCK coding scheme. There are sixty-four possible-sent symbols that the FHT operates on, and a single CCK symbol includes 8 chips. Each chip is represented by a magnitude and a phase. Equalizer 104 receives transmitted CCK signal 102. Buffer 108 gathers 8 chips output by equalizer 104 to form modulated CCK symbol 110. Modulated CCK symbol 110 is provided to FHT correlator 112 where it is correlated with the sixty-four possible-sent symbols. Sixty-four complex correlation values (having both magnitude and phase) are generated by the FHT correlator 112 and provided to phase-assisted CCK demodulator 116. Since the receiver is independent of noise and interference, only the correlation value of the correct symbol will have the largest magnitude, and of the sixty-four correlation values, one (corresponding to the correct symbol) will have a magnitude of 8, six will have a magnitude of $$\frac{8}{\sqrt{2}},$$

twelve will have a magnitude of 4, eight will have a magnitude of $$\frac{4}{\sqrt{2}},$$

thirty-seven will have a magnitude of 0. See FIG. 3 for the correlation values corresponding to the current example. Assuming a predetermined range of 5%, it can be seen that the second largest correlation value $$\left(\frac{8}{\sqrt{2}}\right)$$

does not fall within 5% of the largest correlation value (8). Therefore, the largest correlation value (8) is selected and output as 118 and 126.

One observation that can be made from the correlation strata shown in FIG. 3 is that it allows one to use phase (along with magnitude) to determine the correct index. Notice that the first (correct) and third strata are oriented along a $(k*\pi/2)$ axis, while the second and the fourth are oriented along a $(k*\pi/2+\pi/4)$ axis, where k is an integer value. When, for example, interference causes one of the incorrect indices to have a higher magnitude than the correct one, the most likely candidates are the six values in strata two. These values, however, would ideally be offset by $\pi/4$. This gives an extra differentiator in choosing the correct correlation.

From FIG. 3, which has been generated without adding any interference, the largest correlation value (8) was selected, since the second largest correlation value was not within predetermined 5% range. However, intereference (AWGN, multipath spreading, etc.) may cause one of the other correlation values to have a larger magnitude than the correct correlation value. In such a case, if magnitude alone is used to select a correlation value, the symbol may be incorrectly decoded.

In another embodiment of the present invention, assume that received CCK signal 102 contains additive white Gaussian noise (AWGN) and receiver 100 utilizes a CCK coding scheme. Note that embodiments of the present invention can be utilized in any receiver where AWGN is present. Receiver 100 receives CCK signal 102 and equalizes it using equalizer 104. Buffer 108 gathers 8 chips output by equalizer 104 to create modulated CCK symbol 110. FHT correlator 112 receives modulated CCK symbol 110 and does the equivalent of multiplying the incoming CCK symbol by the complex conjugate of each of the possible-sent symbols (sixty-four in all). Assume that out of the sixty-four possible correlation values generated by the FHT correlator, phase-assisted CCK modulator 116 determines that the largest correlation value is 7+2j and the second largest correlation value is 6.9+j, as seen in FIG. 4. Hence, the magnitude of the largest correlation value is 7.28 and the magnitude of the second largest correlation value is 5.97. Phase-assisted CCK modulator 116 then determines if the second largest is within a predetermined range of the largest correlation value. In this case, the predetermined range has been selected such that the magnitude of the second largest correlation value is checked to see if it is within 5% of the magnitude of the largest correlation value. Since the magnitude of the second largest correlation value is within the predetermined range of the magnitude of the largest correlation value, the phases are used to select one of the correlation values. Phase-assisted CCK modulator 116 then compares the phase of the largest correlation value to the phase of the second largest correlation value and determines which of the largest correlation value and the second largest correlation value has a phase closest to an integer multiple of 90 degrees. In this case, the largest correlation value has a phase of 15.95 degrees and the second largest correlation value has a phase of 8.25 degrees. Since the phase of the second correlation value is closer to an integer multiple of 90 degrees, i.e., 0 degrees, then the second largest correlation value, 6.9+j, is selected by the phase-assisted CCK modulator 116 as the correlation Value whose corresponding symbol represents the demodulated CCK symbol 124.

Phase-assisted CCK demodulator 116 then provides the selected correlation 118 to DQPSK slicer 120, where the DQPSK slicer 120 uses the phase of the selected correlation 118 to yield the phase orientation 122 (two bits) as the first portion of demodulated CCK symbol 124. The selected correlation index 126 corresponding to the selected correlation value is output by phase-assisted CCK demodulator 116 to yield the second portion of demodulated CCK symbol 124. The phase orientation 122 (two bits) is concatenated with the selected correlation index 126 (six bits) to yield the desired eight bit demodulated CCK symbol 124.

FIG. 2 illustrates, in flow diagram form, operation of receiving system 100 in accordance with one embodiment of the present invention. Flow 200 begins with starting oval 201 and proceeds to block 202 where correlation values are received from a correlator. Flow then proceeds to 203 where both the first largest correlation value (C1) and the second largest correlation value (C2) are selected. In decision diamond 204, it is determined whether or not the magnitude of C2 is within a predetermined range of the magnitude of C1. For example, in one embodiment, the predetermined range may be 5 percent such that in decision diamond 204 it is determined whether the magnitude of C2 is within 5% of the magnitude of C1. Alternatively, other values, such as, for example, 10 percent or 15 percent may be used as the predetermined range. The selection of the predetermined range may be based on, for example, empirical data, system requirements, channel noise environments, etc.

If the magnitude of C2 is within the predetermined range of the magnitude of C1, flow then proceeds to block 206, where it is determined which of the correlation values C1 or C2 has a phase closest to an integer multiple of $$\frac{\pi}{2}.$$

In one embodiment of the flow diagram shown in FIG. 2, this is accomplished by letting a=min(|real(C1)|,|imag(C1)|) and b=min(|real(C2)|,|imag(C2)|). If a≦b, then C1 is provided as the selected correlation value and the index of C1 is provided as the selected correlation index 126. If a>b, then C2 is provided as the selected correlation value and the index of C2 is provided as the selected correlation index 126. Flow then proceeds to ending block 207.

Referring back to decision diamond 204, if the magnitude of C2 is not within the predetermined range of the magnitude of C1, flow then proceeds to block 205, where C1 is provided as the selected correlation value and the index of C1 as the selected correlation index. Flow then proceeds to ending block 207.

In one embodiment of the present invention the correlator used in receiver 100 is an FHT correlator, however, in alternate embodiments, the correlator may be any other correlator which produces the correlation values necessary for the coding scheme being used by receiver 100. Furthermore, when utilizing alternate coding schemes (other than CCK), other types of slicers may be used as necessitated by the demodulation process. However, attaining the correlation value with the largest magnitude and the correlation value with the second largest magnitude as described above still applies along with the method of determining which of the phases associated with each of the correlation values has a value close to an integer multiple of $$\frac{\pi}{2}.$$

In one embodiment, the predetermined range described above referencing the second largest magnitude may take upon any number of values necessary to yield the desired correlation results based upon the requirements of the receiver. For example, in one embodiment, the predetermined range may be 10 percent such that the magnitude of the second largest correlation value is checked to see if it falls within 10 percent of the magnitude of the largest. Alternatively, the predetermined range may be 5 or 15 or any other value. Thus, the predetermined range may vary as desired.

In one embodiment of a receiver that uses a correlator to generate correlation values, the initial differentiator in determining which of the correlation values is selected as the selected correlation value is the magnitude of the correlation value. The correlation value having the largest magnitude may be used in combination with the correlation value having the second largest magnitude in those cases where the second largest magnitude is within a predetermined range of the largest magnitude. In one embodiment, utilizing both the largest correlation value and the second largest correlation value allows the phase associated with each of the correlation values to be used as a subsequent differentiator to select which of the correlation values corresponds to the correct symbol, thereby increasing the likelihood that the proper symbol has been demodulated by the receiver.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is

1. A method, in a receiver, for demodulating a modulated symbol, the method comprising:
  receiving, in a correlator, the modulated symbol;
  the correlator generating a plurality of correlation values from the received modulated signal and providing the plurality of correlation values to a phase-assisted demodulator;
  the phase-assisted demodulator selecting at least two of the plurality of correlation values based on magnitude information of the plurality of correlation values;
  the phase-assisted demodulator selecting one of the at least two of the plurality of correlation values based on at least one of magnitude information or phase information of the at least two plurality of correlation values and providing the selected one of the at least two of the plurality of correlation values to a slicer, wherein selecting the one of the at least two of the plurality of correlation values comprises:
    when the at least two of the plurality of correlation values are within a predetermined range of each other, selecting the one of the at least two of the plurality of correlation values based on relative phase information of the at least two of the plurality of correlation values; and
  the slicer using the selected one of the at least two of the plurality of correlation values and a corresponding index of the selected one of the at least two of the plurality of correlation values to provide a demodulated symbol corresponding to the received modulated symbol at an output of the receiver.

2. The method of claim 1, wherein the predetermined range comprises 5%.

3. The method of claim 1, wherein selecting the one of the at least two of the plurality of correlation values further comprises:
   when the at least two of the plurality of correlation values are not within the predetermined range of each other, selecting the one of the at least two of the plurality of correlation values having a larger magnitude.

4. A method, in a receiver, for demodulating a modulated symbol, the method comprising:
   receiving, in a correlator, the modulated symbol;
   the correlator generating a plurality of correlation values from the received modulated signal and providing the plurality of correlation values to a phase-assisted demodulator;
   the phase-assisted demodulator selecting at least two of the plurality of correlation values based on magnitude information of the plurality of correlation values, wherein selecting at least two of the plurality of correlation values comprises:
      selecting a first correlation value of the plurality of correlation values having a largest magnitude; and
      selecting a second correlation value of the plurality of correlation values having a second largest magnitude;
   the phase-assisted demodulator selecting one of the at least two of the plurality of correlation values based on at least one of magnitude information or phase information of the at least two plurality of correlation values and providing the selected one of the at least two of the plurality of correlation values to a slicer, wherein selecting one of the at least two of the plurality of correlation values comprises:
      if a magnitude of the first correlation value is within a predetermined range of a magnitude of the second correlation value, selecting the one of the at least two of the plurality of correlation values based on which one of the first correlation value or the second correlation value has a phase closest to a $\pi/2$ axis; and
   the slicer using the selected one of the at least two of the plurality of correlation values and a corresponding index of the selected one of the at least two of the plurality of correlation values to provide a demodulated symbol corresponding to the received modulated symbol at an output of the receiver.

5. The method of claim 1, wherein the modulated symbol comprises a complementary code keying (CCK) symbol.

6. The method of claim 1, wherein the modulated symbol comprises a Reed-Muller encoded symbol.

7. A receiver comprising:
   an input which receives a modulated signal;
   a correlator which generates a plurality of correlation values from the received modulated signal;
   a phase-assisted demodulator, coupled to the correlator, which selects one of the plurality of correlation values based on relative magnitude and relative phase information of at least a two of the plurality of correlation values;
   an output which provides a demodulated signal, corresponding to the modulated signal, based on the selected one of the plurality of correlation values; and
   a slicer, coupled to the phase-assisted demodulator, which receives the selected one of the plurality of correlation values and provides a phase orientation of the selected one of the plurality of correlation values, wherein the demodulated signal is based on the phase orientation and an index of the selected one of the plurality of correlation values.

8. The method of claim 1, wherein the received modulated signal adheres to an IEEE 802.11b standard.

9. The method of claim 1, further comprising:
   using phase information of the selected one of the at least two of the plurality of correlation values to obtain a phase orientation.

10. The method of claim 9, wherein using the selected one of the at least two of the plurality of correlation values and the corresponding index to provide a demodulated symbol comprises using the selected one of the at least two of the plurality of correlation values, the corresponding index, and the phase orientation to provide the demodulated symbol.

11. The method of claim 4, wherein the received modulated signal adheres to an IEEE 802.11b standard.

12. The method of claim 4, wherein the modulated symbol comprises a complementary code keying (CCK) symbol.

13. The method of claim 4, wherein the modulated symbol comprises a Reed-Muller encoded symbol.

14. The method of claim 4, further comprising:
   using phase information of the selected one of the at least two of the plurality of correlation values to obtain a phase orientation.

15. The method of claim 14, wherein using the selected one of the at least two of the plurality of correlation values and the corresponding index to provide a demodulated symbol comprises using the selected one of the at least two of the plurality of correlation values, the corresponding index, and the phase orientation to provide the demodulated symbol.

16. The receiver of claim 7, wherein, to select the one of the plurality of correlation values, the phase-assisted demodulator selects at least two of the plurality of correlation values based on relative magnitude information of the plurality of correlation values and selects one of the at least two of the plurality of correlation values as the selected one of the plurality of correlation values based on relative phase information of the at least two plurality of correlation values.

17. The receiver of claim 16, wherein each of the at least two of the plurality of correlation values has a magnitude larger than a magnitude of each correlation value in a remaining portion of the plurality of correlation values.

18. The receiver of claim 17, wherein the magnitudes of the at least two of the plurality of correlation values are within a predetermined range of each other.

19. The receiver of claim 7, wherein the modulated signal comprises a complementary code keying (CCK) signal.

20. The receiver of claim 7, wherein the modulated signal comprises a Reed-Muller encoded signal.

* * * * *